July 15, 1941.   W. F. GROENE ET AL   2,249,240
POWER CHUCKING DEVICE
Filed Feb. 9, 1940   6 Sheets-Sheet 1
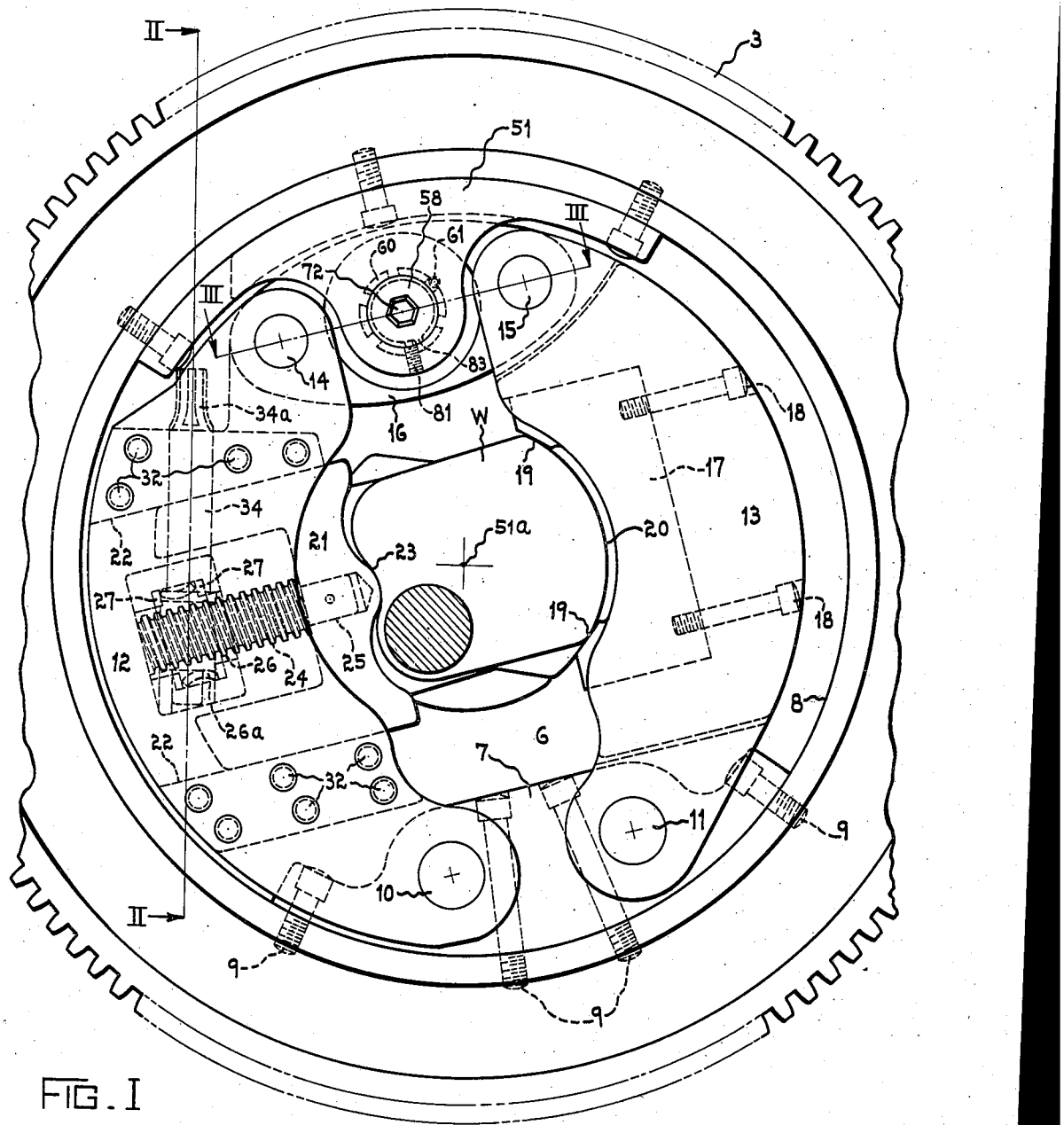
FIG. I
INVENTORS.
WILLIAM F. GROENE
WALTER R. MEYER
BY
ATTORNEY.

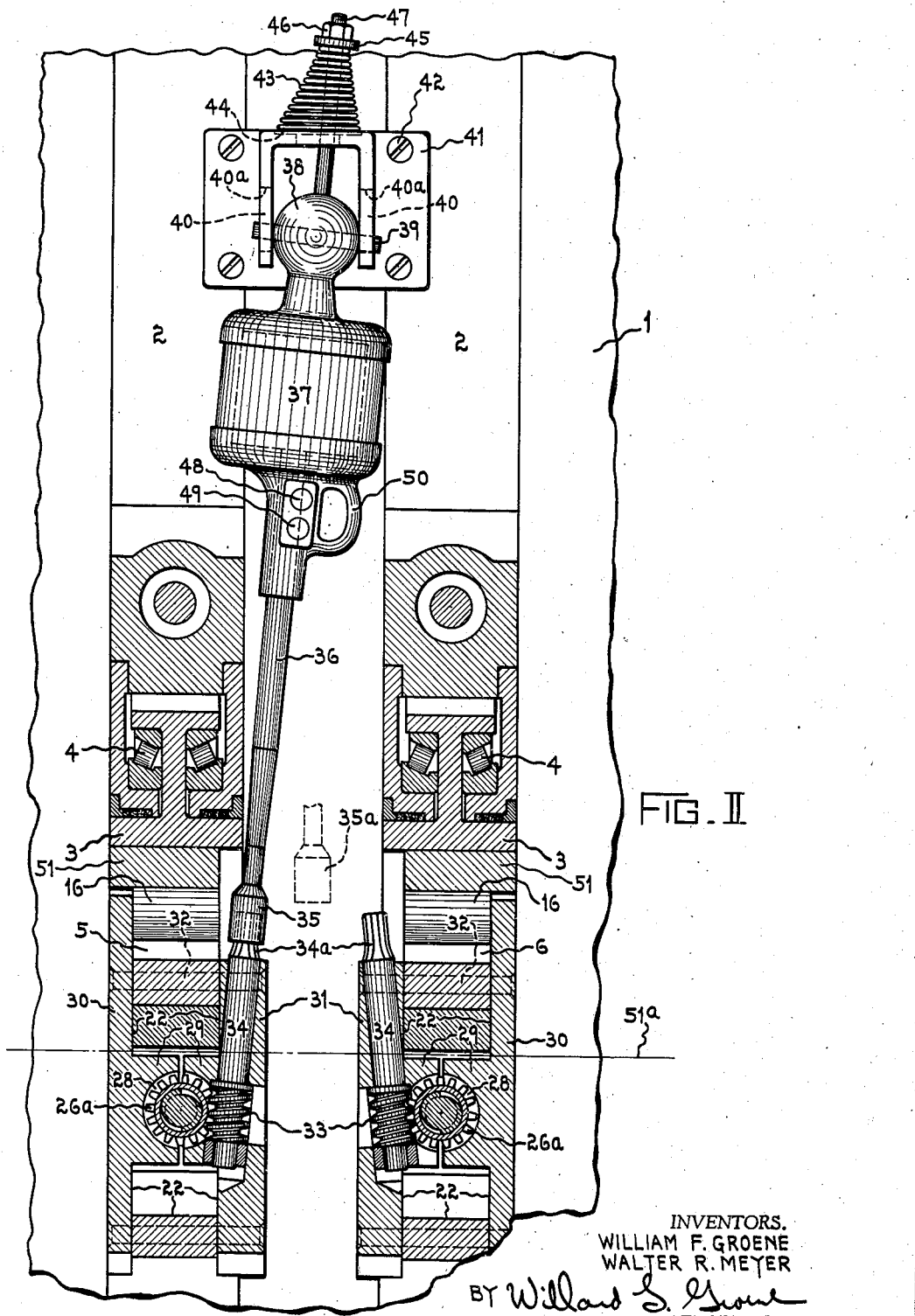
FIG. II

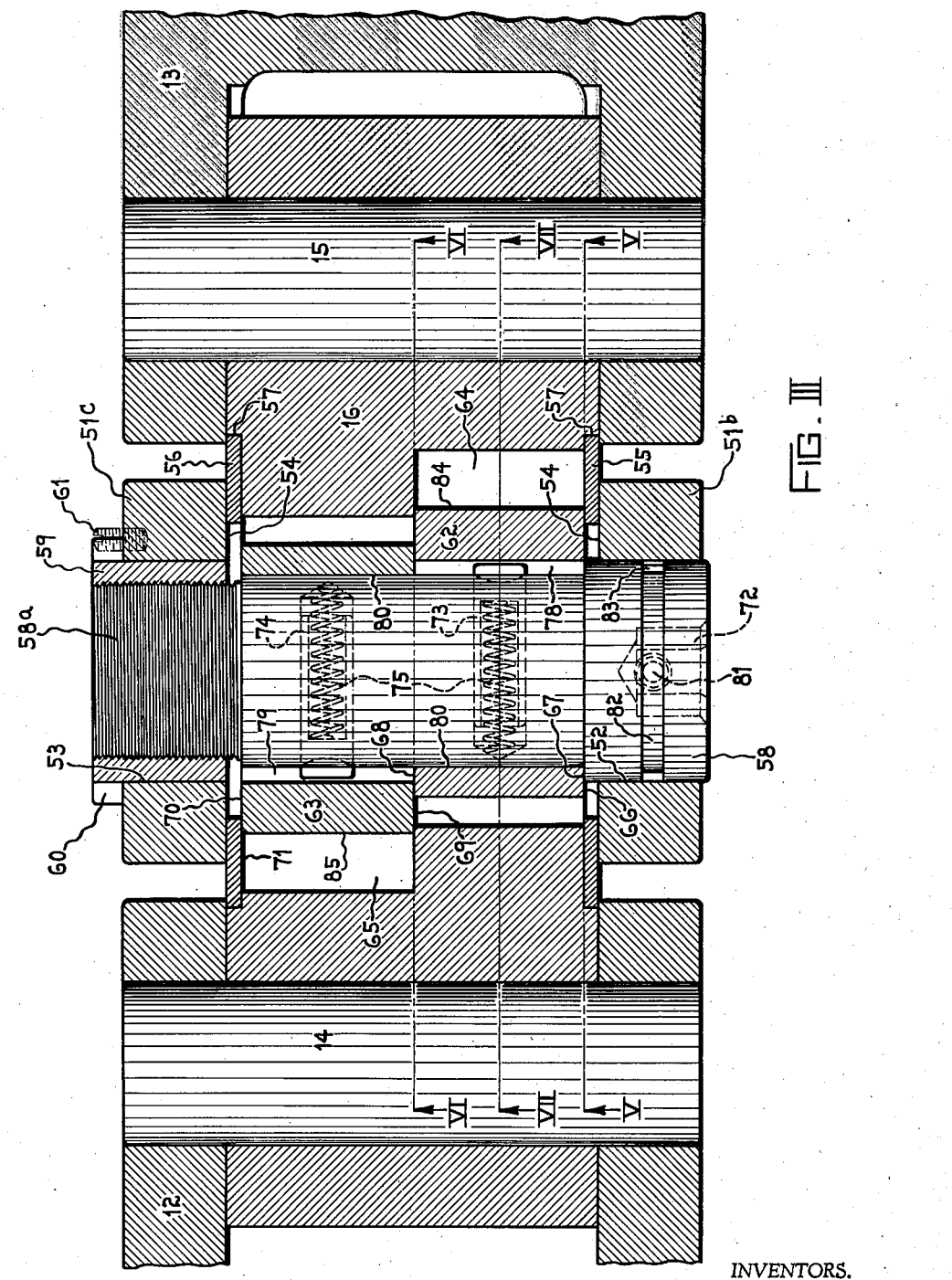

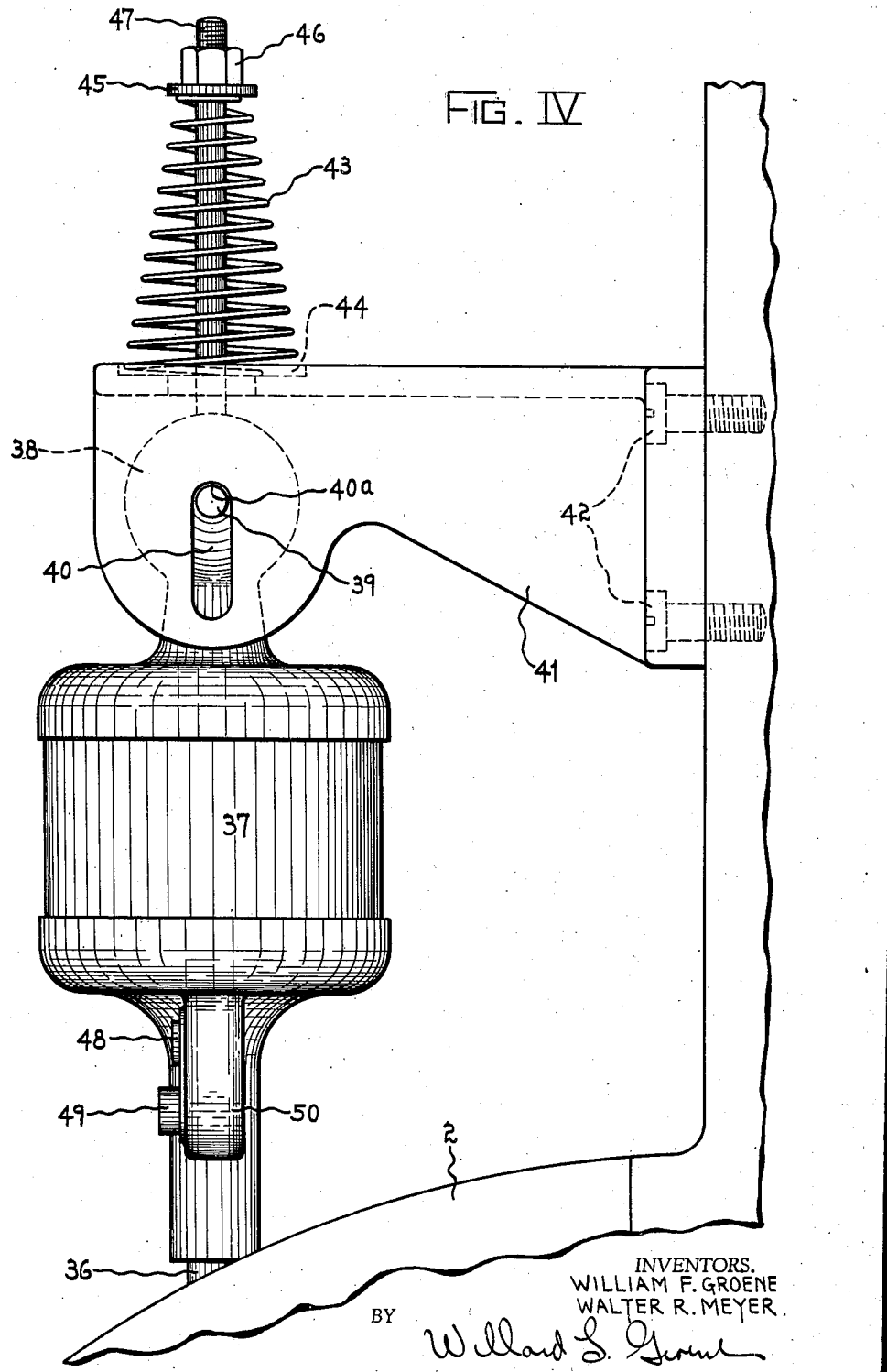

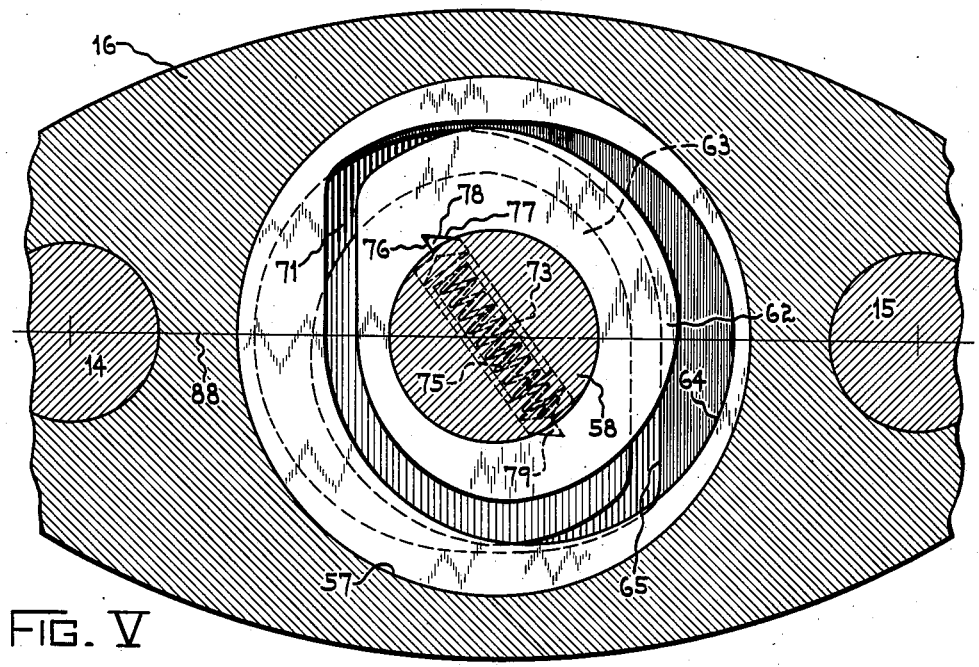
FIG. V
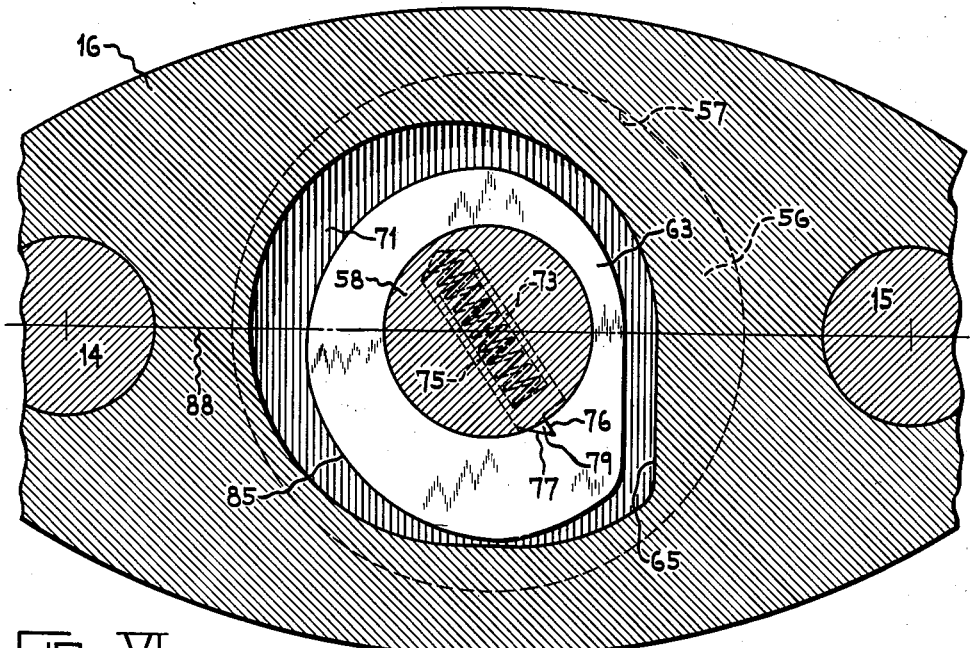
FIG. VI

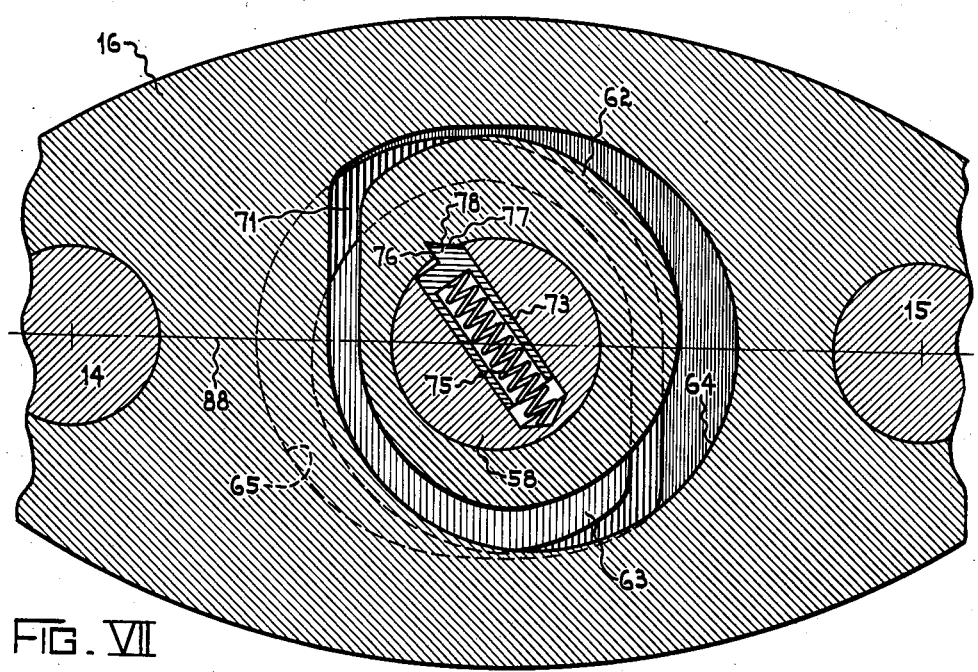
FIG. VII
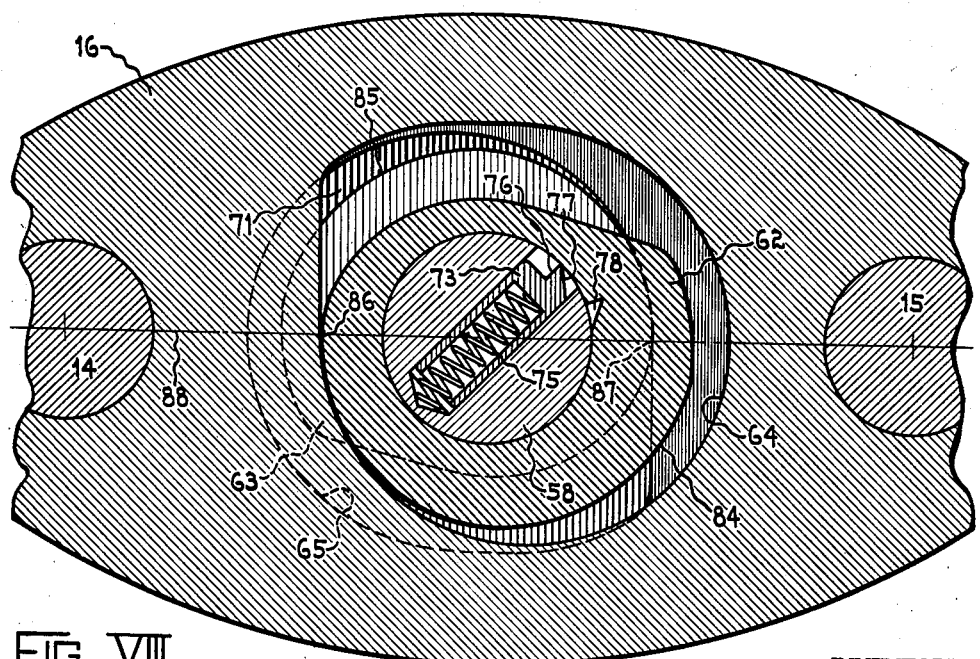
FIG. VIII
INVENTORS.
WILLIAM F. GROENE
WALTER R. MEYER Patented July 15, 1941

2,249,240

UNITED STATES PATENT OFFICE 2,249,240

POWER CHUCKING DEVICE

William F. Groene and Walter R. Meyer, Cincinnati, Ohio, assignors to The R. K. LeBlond Machine Tool Company, Cincinnati, Ohio, a corporation of Delaware Application February 9, 1940, Serial No. 318,184

21 Claims. (Cl. 82—40)

This invention pertains to power chucking devices for machine tools, and is particularly related to power chucking mechanism for use in conjunction with double center drive crankshaft lathes for chucking and rotating crankshafts for the purpose of turning their various bearing portions.

An object of this invention is to provide an arrangement for operating chucking devices in a center drive lathe by power to effect clamping of a work piece in such chucking devices.

Another object of this invention is to provide a chucking device which is capable of engaging a rough irregular pre-located work piece in a machine tool by means of power actuated mechanism and to provide in conjunction with this mechanism means for locking the work engaging members of such chucking devices to the work spindle, without disturbing the pre-located position of the work piece to be gripped and to firmly hold the work during the machining operations.

Still another object of this invention is to provide in a center drive lathe, a rough work engaging chucking device in a center drive ring gear and to provide power means for actuating said chucking device so as to grip the rough irregular work piece without distorting it from its true pre-located position in the lathe and to provide in conjunction with said chucking device means to positively lock the work engaging members to the ring gear of the center drive chucking mechanism.

Still another object of this invention is to provide in a double center drive lathe, having a pair of center drive chucking devices adapted to engage a work piece in said lathe, a power operated device for effecting clamping or unclamping of each of said chucking devices with respect to the work piece in said lathe.

Still another object of this invention is to provide in a double center drive lathe, chucking device in each of the ring gears of said lathe, and a power means which may be selectively engaged with one or the other of said chucking devices for effecting clamping or unclamping of said devices with respect to a work piece in said lathe.

Another object of this invention is to provide in a chucking device on a work spindle of a lathe adapted to grip a rough irregular work piece prelocated on the axis or rotation of the chuck by means of a series of floating work engaging members, mechanism for effecting locking of said work engaging members to the work spindle, which mechanism automatically positively locks said members against any floating movement on the work spindle without causing movement of said members when engaged on the work piece to thereby prevent any distortion of the work piece from its true pre-located position during this locking action.

Further features and advantages of this invention will appear from the brief description, the detailed description of the drawings in which:

Figure I is an actual view of a center drive chucking device adapted to grip a rough irregular pre-located work piece in the lathe which is actuated to engage or disengage the work piece by means of power.

Figure II is a fragmentary front elevation of a double center drive lathe showing the center drive chucking device in the center drive ring gear and the power operating mechanism for clamping and unclamping chucking devices.

Figure III is a section through the locking device for the work engaging members of one of the chucking devices in the ring gears of Figure II shown on the line III—III of Figure I.

Figure IV is a right hand end elevation showing upper portion of the power operating mechanism for actuating the chucking devices.

Figure V is a fragmentary section of the locking device on the line V—V of Figure III.

Figure VI is a fragmentary section through the locking device of chucking mechanism on the line VI—VI of Figure III.

Figure VII is a section through the locking device of Figure III on the line VII—VII showing the position of the locking cam at the time of work engagement or disengagement by the chucking devices for free floating movement of these work engaging members.

Figure VIII is a section on the same line as Figure VII showing the position of the locking cam after the work engaged members have been fully brought up by power on the work piece so as to prevent all floating movement in said work engaging members.

For purposes of an exemplary disclosure of our invention we show an application to a typical double center drive crankshaft lathe of a character for example shown in Patent No. 2,191,935.

Noting Figure II the machine comprises a frame 1 incorporating the center drive ring gear housings 2 in which are appropriately rotatably mounted the center drive ring gears 3 on suitable bearings 4, these gears being appropriately driven by suitable electric motors incorporating mechanism for accurately stopping these work spindles of a character shown in Patent No. 2,192,437. In each of the ring gears is mounted a chucking device 5 and 6 of a character best shown in Figure I. Each of these chucking devices comprises a block 7 which is fixed to the bore 8 of the ring gears 3 by means of appropriate screws 9. Rigidly mounted on suitable pins 10 and 11 in this block 7 are the work engaging arms 12 and 13 whose other ends are connected by pins 14 and 15 to the locking link 16. In the swinging arm 13 is fixed the work engaging block 17 by suitable screws 18 having abutment work engaging surfaces 19 ranged to swing to its engagement on rough irregular surface 20 of a pre-located work piece, or in this instance the web W of a crankshaft to be turned in the lathe.

In order to force these abutments into engagement with the web 20 and to firmly maintain them in such engagement, a sliding clamping jaw 21 is mounted by suitable guide ways 22 in the swinging jaw 12 having a work engaging abutment 23 adapted to engage the surface of the web W in an opposed relation to the abutments 19 of the block 17. Means is provided for forcing this sliding jaw 21 with abutment 23 into engagement with the web W comprising a screw 24 which is fixed at 25 in this jaw 21 and has operating about it a nut 26 which is confined against axial movement in the arm 21 by suitable cross collars 27 which bear against the counterbores 28, Figure II, formed in projection 29 of plates 30 and 31 fixed to the jaw 12 by suitable rivets 32 so that when it is rotated it effects sliding movement of the jaws 21 along the guideways 22 in the arm 12. In order to effect rotation of this nut by power a worm wheel 26a is formed on the rotatable nut 26 which is engaged by a worm 33 fixed on worm shaft 34 appropriately journaled in the plate 31 as best shown in Figure I, projecting circumferentially of the ring gear 3 and also at an angle to the axis of rotation of said ring gear in the lathe.

The upper end of the worm shaft 34 is provided with a suitable splined end 34a which may easy be engaged by the socket 35 carried on the shaft 36 of the clamping and unclamping motor 37. This clamping motor 37 is carried on the frame of the lathe so that it may have vertical up and down movement so that its socket end may be freely moved to insert the socket 35 on either of the splined ends 34a of the worm shafts 34 in each chucking device. The housing of the motor 37 is arranged so it cannot rotate about the axis of driving the shaft 36. This mounting comprises an integral ball portion 38 on the housing of the motor 37 and has a cross pin 39 fixed therein and having projecting ends operating in appropriate slots 40 in a bracket 41 fixed to the machine frame 1 or center drive housings 2 by suitable screws 42. In this way motor 37 may be moved up and down as limited by the slot 40 and may be swiveled about the ball portion 38 for application of the socket 35 on either of the work shafts 34. In order to normally raise the motor 37 in its upward position while still allowing this freedom of movement just described a conical compression spring 43 is suitably confined in the counterbore 44 on the upper portion of the bracket 41 and also confined at its upper end by a washer 45 and nut 46 carried on the upwardly projecting stem 47 fixed integrally with the ball portion 38 of the motor 37. In this way the spring 43 normally is sufficiently strong to just slightly raise the entire assembly constituting the motor and ball portion 38 and its shaft and socket 35 upwardly so that pin 39 normally engages the upward portions 40a of the slots 40 in order that its socket end 35 will assume the position 35a when undisturbed by manual operation as shown in Figure II to prevent interference with the chucking device and splined ends 34a of the shaft 34 during the cutting operation of the lathe on the crankshaft when chucked in the center drive chucking devices. The pin 39 obviously permits rotation of the motor 37 and associated parts when power is applied to it by manipulation of the push buttons 48 and 49 associated with the operating handle 50 for effecting rotation of the motor 37 in either direction for clamping or unclamping of the work in the chuck by appropriately rotating the work shaft 34 of the mechanism described. With this unique arrangement it is obvious that no effort is required on the part of the operator to hold the motor 37 during the clamping or unclamping operation and also by merely removing the hand from the device 37 it will normally assume an inoperative and unobstructing position in the lathe ready for immediate operation of the work spindle for the cutting cycle.

Having thus provided power means for effecting the clamping of the clamping arms 12 and 13 with the respective abutments 19 and 23 on the prelocated work piece W in the lathe and allow the power clamping mechanism 37 to return to inoperative position 35a it is then necessary to lock the arms 12 and 13 against any motion relative to the ring gears 3 in such a way as not in any way disturb the pre-located position of the work W on the axis 51a of the lathe. The mechanism is best shown in Figures III, V, and VI. In the bore 8 of the ring gears 3 is fixed the locking block 51 having integral projecting lugs 51b and 51c having the respective bores 52 and 53. The locking link 16 is nicely slidably mounted between the surfaces 54 of these projections 51b and 15c these surfaces being engaged by thrust washers 55 and 56 carried in counterbores 57 formed in the locking link 16. In the bore 52 of the projection 51b is journaled the locking stud 58 and in the bore 53 of the projection 51c is journaled the adjusting nut 59 having appropriate slots 60 for application of a spanner wrench for rotating the nut 59 for adjustment and a suitable set screw 61 for locking this nut 59 in adjusted position on the projection 51c. The locking shaft 58 has a threaded portion 58a which is threaded into the adjusting nut 59. Journaled on this locking shaft 58 are the locking cams 62 and 63 which operate in the respective eccentric bores 64 and 65 formed in the locking link 16. These locking cams 62 and 63 are confined axially of the shaft 58 by engagement of the surface 66 of the cam 62 with the shoulder 67 of the shaft 58, engagement of the surfaces 68 and 69 of the cam 62 and 63 respectively, engagement of surface 70 of the cam 63 with surface 71 of the thrust collar 56 which in turn engages the surface 54 of the projection 51c of the locking block 51. It can thus be seen that by rotating the shaft 58 by appropriately applying a wrench to the wrench socket 72 provided in the shaft 58 all of these surfaces will be brought into firm engagement as the shaft 58 is rotated with threaded end portion 58a in the nut 59 draws all of these cams 62 and 63 and washer 56 firmly up against surface 54 of the projection 51c so as to prevent rotation of these cams 62 and 63 when the shaft 58 is so rotated.

Means is provided for yieldingly effecting rotation of these cams 62 and 63 into locking position and for positively rotating said cam from locked position. This mechanism comprises the spring urged plungers 73 and 74 carried in the shaft 58 and urged radially outwardly by appropriate springs 75. The outer end of these plungers have a projection having a radially extending surface 76 and an angular surface 77 which are arranged to engage mating notches 78 and 79 in the bores upon which the cams 62 and 63 are journaled on the shaft 58 these plungers 73 and 74 are normally urged radially outward so that as the shaft 58 is rotated they will automatically engage in the notches 78 and 79 to cause the cam to rotate with the shaft 58 in either direction. A limiting stop comprising the set screw 81 fixed in the projecting lug 51b of the locking block 51 operates in the angular slot 82 formed in the shaft 58 and which slot is provided an obstruction 83 so that the shaft 58 may not be rotated completely around but being limited to a rotation of less than 360°.

The operation of this locking mechanism is substantially as follows: After the clamping arms 12 and 13 have been appropriately engaged on the crankshaft web W as described, the locking link 16 up to this time has been permitted free sliding motion between the surfaces 54 of the projecting plug 51b and 51c of the block 51. At this time the shaft 58 has also been rotated counterclockwise as shown in the Figures V, VI, and VII with the obstruction 83 and the annular slot 82 engaging one side of the screw 81 to determine its initial starting position or position of initial work engagement for the work engaging arms 12 and 13. Under these conditions both of the plungers 73 and 74 have their ends engaged in the respective notches 78 and 79 of the cams 62 and 63 so as to have rotated these cams to the position shown in Figures V, VI, and VII. In order to effect the lock of this locking link 16 to the locking block 51 so as to prevent all floating motion in the arms 12 and 13 a suitable wrench is applied to the socket 72 of the shaft 58 and the shaft rotated in a clockwise direction as shown in said figure. In so doing this the cams are carried around with the rotation of the shaft 58 by engagement of the angular surfaces 77 of the plungers 73 and 74 with the corresponding angular surfaces of the notches 78 and 79 in each of the cams. After these cams have been moved to the position where their eccentric surfaces 84 and 85 come in contact with the surfaces 86 and 87 of the eccentric bores 64 and 65 they will be restricted from further movement because of the work piece W which has been prelocated to hold the arms 12 and 13 against any further light movement. After these cams 62 and 63 have thus been lightly engaged with the respective surfaces 86 and 87 of the eccentric bores further rotation of the shaft 58 will cause the plungers to be depressed by the sliding up of the angular surfaces 77 out of the notches 78 and 79 in each of the cams so as to lightly press these cams into engagement with the surfaces in the eccentric bores 64 and 65 and also permitting continued rotation of the shaft 58 which continued motion causes clamping up of these cams securely against the surface 54 of the projection 51c of the locking block 51 by operation of the threaded portion 58a of the shaft 58 in the adjusting nut 59 as described so as to prevent any possibility of the backing off of these cams 62 and 63 after they have been properly lightly engaged in the eccentric bores 64 and 65. In this manner a positive locking is effected between the locking link 16 and the member 51 which carries the shaft 58 as indicated in the direction of clamping force indicated on the line 88 of Figure VIII connecting the contact point of the cams with their respective surfaces in the eccentric bores 64 and 65 in the clamping link 16 to thereby positively prevent any further swinging motion of the arms 12 and 13 about the pins 10 and 11 and thereby securely locking the work piece in the chuck on its proper axis of rotation 51a.

Having completed the turning of the crankshaft and then preparatory to unchucking the shaft in the lathe a wrench is again placed in socket 72 of the shaft 58 and it is then rotated counterclockwise. In doing this the plungers, which have been, at the time of complete chucking and locking, in the position shown in Figure VIII with the obstruction 83 in annular slot 82 against the set screw 81, are moved around the bores of the cams 62 and 63 until they jump into the slots 78 and 79 of the respective cams. Their radially extending surfaces 76 then engaging mating surfaces in the slots of the cams to positively effect rotation of these cams by the shaft 58 for assuring withdrawal of these cams from engagement with the eccentric surfaces of the eccentric bores 64 and 65 in the clamping locking link 16. This counterclockwise motion of the shaft 58 also effecting release of these cams from bound up engagement with the projection 51b just prior to the engagement of these plungers in the slot for positively rotating these cams to a position permitting re-floating movement of the arms 12 and 13 of the chucking device.

We have thereby provided a locking device for an equalizing chucking mechanism arranged to grip a rough prelocated work piece in the lathe which first, provides means for effecting a positive locking out of equalizing motion of the work engaging members without causing any distortion in the prelocated crankshaft during this locking process and second, to provide means to prevent any release of this positive locking mechanism due to the cutting operation on the lathe. It is then arranged so as to be automatically released both from restricting the free floating movement of the work engaging members at the time of insertion or removal of the work and during the initial work engaging function of the chuck.

Having thus fully set forth and described our invention what we claim as new and desire to secure by United States Letters Patent is:

1. In a double center drive lathe, a frame, a pair of center drive ring gears rotatably mounted in said frame, a chucking device in each of said ring gears, operatable mechanism in each of said chucking devices effective for clamping or unclamping a work piece in said lathe, a source of power, and means operable between said center drive ring gears and alternately connectable to one or the other of said ring gears to effect clamping and unclamping action in said chucking devices.

2. In a lathe, a rotary work spindle, a chucking device in said work spindle, work engaging members operable in said chucking device, means for effecting operation of said work engaging members by power comprising a motive means mounted for universal movement on the frame of said lathe and against rotary movement thereon, and means for connecting power from said motive means to said chucking device to effect operation of said work engaging members.

3. In a lathe, a rotatable work spindle, a chucking device in said work spindle, work engaging members operable in said chucking device, a source of power for operating said chucking device carried on the frame of said lathe, and means interconnecting said source of power to the operating mechanism of said chucking device comprising a splined shaft and socket connection having its axis of rotation extending substantially circumferentially of said work spindle.

4. In a double center drive lathe, a frame, a pair of rotary center drive ring gears mounted in said frame, chucking mechanism in each of said ring gears, work engaging members operable in said chucking mechanism, a source of power for actuating said chucking mechanism carried on said frame, mechanism interconnecting said source of power to said chucking devices comprising splined shaft and socket connection having its axis of rotation extending in a plane angularly related to the axis of rotation of said center drive ring gears.

5. In a double center drive crankshaft lathe, a frame, a pair of rotatably mounted center drive ring gears, chucking mechanism in each of said ring gears, work engaging members operable in each of said chucking devices, power means for operating said work engaging members comprising an electric motor, means for mounting said electric motor against rotation on said frame of said lathe and for universal movement and vertical reciprocatory movement thereon, a shaft connecting said motor to a socket, and a splined shaft engageable by said socket in each of said chucking devices.

6. In a double center drive crankshaft lathe, a frame, a pair of rotatably mounted center drive ring gears, chucking mechanism in each of said ring gears, work engaging members operable in each of said chucking devices, power means for operating said work engaging members comprising, an electric driving motor, means for mounting said motor movably on said frame whereby said motor may be alternately connected to one or the other of said chucking devices, and means for withdrawing said motor automatically to inoperative position when released by the operator for the turning and loading and unloading operation of said lathe.

7. In a chucking device for a lathe, a rotary work spindle, a chucking device on said work spindle, work engaging members operable to engage a work piece prelocated on the axis of rotation of said lathe, power means for effecting operation of said work engaging members, and means for locking said work engaging members to said work spindle after engagement with said work piece effected by said power means.

8. A chucking mechanism for lathe comprising a rotatable work spindle, a chucking device mounted on said work spindle, members operable in said chucking device to engage a work piece prelocated on the axis of rotation of said lathe, power means operable to effect engagement of said chucking device on said work piece, and manually operated means for effecting positive locking of said work engaging members to the work spindle after the clamping action of said chucking device by said power means has been effected on said work piece in said lathe.

9. A chucking device for lathe comprising, a rotary chuck body, a pair of clamping arms pivotally mounted on said chuck body, a link inter-connecting the outer ends of said arms, work engaging abutment means in each of said arms, and means for effecting clamping of said work engaging abutment means on a work piece prelocated on the axis of rotation of said chuck body, and means for positively locking said interconnecting link to said chuck body when said work engaging abutments are tightly clamped on said work piece.

10. In a chucking device for lathe, a rotary chuck body, a pair of pivotally mounted clamping arms on said chuck body, fixed work engaging abutment means on one of said arms, movable work engaging abutment means on the other of said arms, a link interconnecting the outer ends of said arms, and means for effecting movement in said movable abutment means whereby all of said abutments are rigidly engaged with a prelocated work piece on the axis of rotation of said chuck body, and means for locking said link to said body.

11. In a locking device for two relatively movable members, a bore in one of said members, a shaft rotatively mounted in the other of said members and extending through said bore, cam means on said rotatable member, and means for rotating member for lightly engaging said cam means in said bore.

12. In a locking device for two relatively movable members, a bore in one of said members, a shaft rotatably mounted in the other of said members and extending through said bore, cam means on said shaft, means for rotating said shaft so as to engage said cam means in said bore, and means effective by the rotation of said shaft, after said cams have engaged said bore, to lock said cam means against further rotation relative to both of said members.

13. In a locking device for two relatively movable members, a pair of eccentric bores in one of said members, a locking shaft rotatably mounted in the other of said members and extending through said eccentric bores, and cam means journaled on said shaft in each of said bores, means effective upon rotation of said shaft for yieldingly rotating said cam means into engagement with said bores.

14. In a locking device for two relatively movable members, a pair of eccentric bores in one of said members, a locking shaft rotatably mounted in the other of said members and extending through said eccentric bores, and cam means journaled on said shaft in each of said bores, means effective upon rotation of said shaft for yieldingly rotating said cam means into engagement with said bores, and to simultaneously lock said cam means against further rotation relative to either of said members.

15. In a locking device for two relatively movable members, a pair of eccentric bores in one of said members, a locking shaft rotatably mounted in the other of said members and extending through said eccentric bores, and cam means journaled on said shaft in each of said bores, means effective upon rotation of said shaft for yieldingly rotating said cam means into engagement with said bores, and to simultaneously lock said cam means against further rotation relative to either of said members, and means for positively rotating said cams from engagement with said eccentric bores.

16. In a lathe, a frame, a crankshaft chuck journalled in said frame, comprising a pair of articulated clamping members adapted to engage the web of a crankshaft, means for equally locking them against the opposite sides of the web of said crankshaft, and remote power means independent of said chuck for actuating said clamping means, and means on said frame for carrying said power means whereby the torque of said power means is transmitted to said frame in operating the chuck and its locking mechanism when power is applied.

17. In a crankshaft chuck, the combination of a ring gear support for rotating the crankshaft, articulated engaging members pivoted thereon adapted to engage opposite sides of a web of a crankshaft, means to draw the ends of said articulated members together to clamp the opposite sides of said web with equal engaging pressure, and independent power means adapted to actuate said clamping means for drawing the articulated members together, and means for locking them in engaging position with said crankshaft web.

18. In a crankshaft chuck, a ring gear support, articulated members pivotally mounted upon said ring gear, replaceable web engaging surfaces mounted in the faces of said articulated members, at least one of said engaging surfaces being power actuated, means of actuating said articulated members remotely by external power, and means of locking the ends of said articulated members to said ring gear.

19. In a crankshaft chuck, a rotating means, a pair of clamping arms pivotally mounted thereon having crankshaft web engaging members, means of locking said arms together at their opposite disposed ends from their pivoted ends, and means comprising an independent power means for moving one of said crankshaft engaging surfaces and one of said arms independently into locking engagement with said crankshaft.

20. In a crankshaft chuck, power driven means independent of said chuck for engaging a rough irregular work piece; work engaging members of the chuck adapted to engage the crankshaft, means to lock said members whereby the crankshaft is located and locked in the chuck without disturbing the prelocated position of the crankshaft that is gripped and firmly held during the subsequent machining operation.

21. In a crankshaft chuck, a pair of floating arms having web engaging abutments, at least one of which is movable, means for pivotally supporting said arms at one end of said chuck, a floating link connecting said arms at their other ends, locking means associated with said link for locking said arms in a predetermined position, independent power means for actuating one of said crankshaft web engaging faces whereby after said crankshaft is suitably engaged by said faces, carried by said arms, by the actuation of said power actuated mechanisms, then said arms are locked in such engaging position without disturbing the prelocated position of the crankshaft thus gripped and firmly held for subsequent machining operations.

WILLIAM F. GROENE.
WALTER R. MEYER.